United States Patent
Kudrus et al.

(10) Patent No.: US 6,787,957 B2
(45) Date of Patent: Sep. 7, 2004

(54) GODET ROLL FOR GUIDING, HEATING AND CONVEYING YARN

(75) Inventors: Heiner Kudrus, Barmstedt (DE); Dietmar von Zwehl, Bodensee (DE)

(73) Assignee: Neumag GmbH & Co. KG, Neumunster (DE)

( * ) Notice: Subject to any disclaimer, the term of this patent is extended or adjusted under 35 U.S.C. 154(b) by 0 days.

(21) Appl. No.: 10/631,694

(22) Filed: Jul. 30, 2003

(65) Prior Publication Data

US 2004/0021383 A1 Feb. 5, 2004

Related U.S. Application Data

(63) Continuation of application No. 10/061,610, filed on Feb. 1, 2002, now Pat. No. 6,717,309.

(30) Foreign Application Priority Data

Feb. 1, 2001 (DE) .......................... 101 04 424

(51) Int. Cl.$^7$ ............................. H02K 7/09; D01H 4/00; D02J 13/00; F16C 39/06
(52) U.S. Cl. ...................... 310/90.5; 310/66; 310/67 R; 310/90; 242/18 R; 57/352
(58) Field of Search ........................ 310/90.5, 66, 90, 310/67 R; 242/18 R; 57/352

(56) References Cited

U.S. PATENT DOCUMENTS

| | | | |
|---|---|---|---|
| 4,180,946 A | 1/1980 | Heijkenskjold et al. | 51/134.5 R |
| 5,168,186 A | * 12/1992 | Yashiro | 310/47 |
| 5,679,992 A | 10/1997 | Miyamoto et al. | 310/90.5 |
| 5,762,276 A | * 6/1998 | Migaki | 242/18 |
| 5,772,564 A | 6/1998 | Taniguchi et al. | 483/7 |
| 5,954,258 A | * 9/1999 | Baader | 226/188 |
| 5,973,430 A | 10/1999 | Brunet | 310/90.5 |
| 5,987,871 A | 11/1999 | Winzen | 57/406 |
| 6,069,426 A | * 5/2000 | Baader | 310/67 R |

FOREIGN PATENT DOCUMENTS

| | | | |
|---|---|---|---|
| DE | 195 38 261 | 4/1997 | |
| DE | 197 07 790 | 9/1997 | |
| DE | 197 33 239 | 2/1999 | |
| EP | 0 622 972 | 11/1994 | |
| EP | 0770719 | * 2/1997 | D02J/13/00 |
| EP | 0 770 719 | 5/1997 | |
| JP | 61136876 | * 6/1986 | B65H/63/06 |

* cited by examiner

Primary Examiner—Burton S. Mullins
Assistant Examiner—Iraj A. Mohandesi
(74) Attorney, Agent, or Firm—Kennedy Covington Lobdell & Hickman, LLP

(57) ABSTRACT

A godet roll for guiding, heating and conveying yarn on the circumference of a hollow-cylindrical godet roll casing. The godet roll casing is seated on a projecting support by at least one magnetic bearing having bearing pole windings, and a heating device with heating pole windings is arranged on the support. Some bearing pole windings and at least one heating pole winding are arranged together in one bearing plane, so that the bearing areas can be heated. Sensors provided for detecting the position of the godet roll casing are arranged outside of an annular chamber formed between the godet roll casing and the support in order to prevent a thermal overload of the sensors.

13 Claims, 4 Drawing Sheets

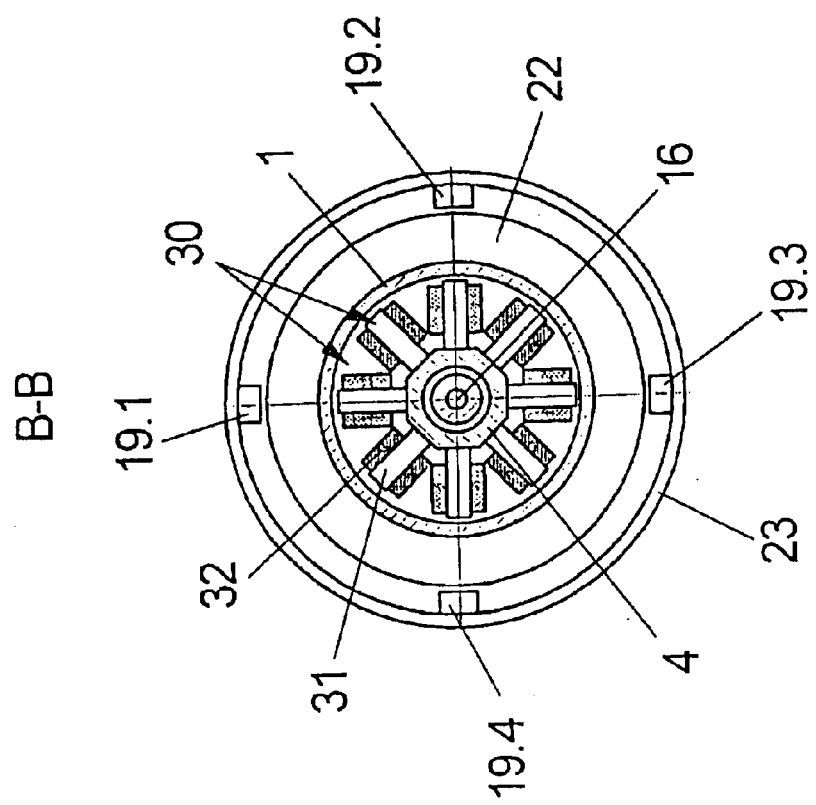
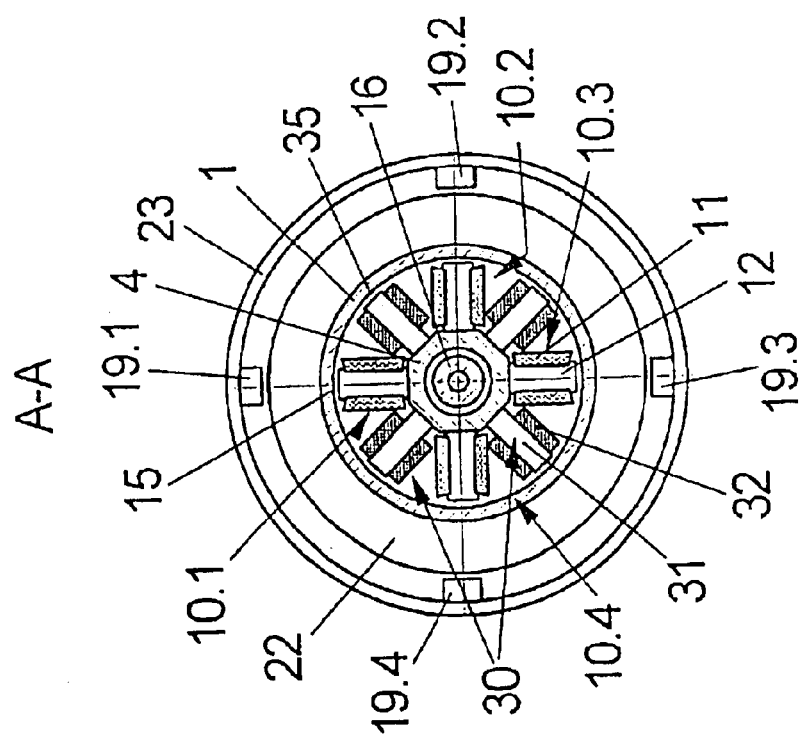
Fig.2.1
Fig.2.2

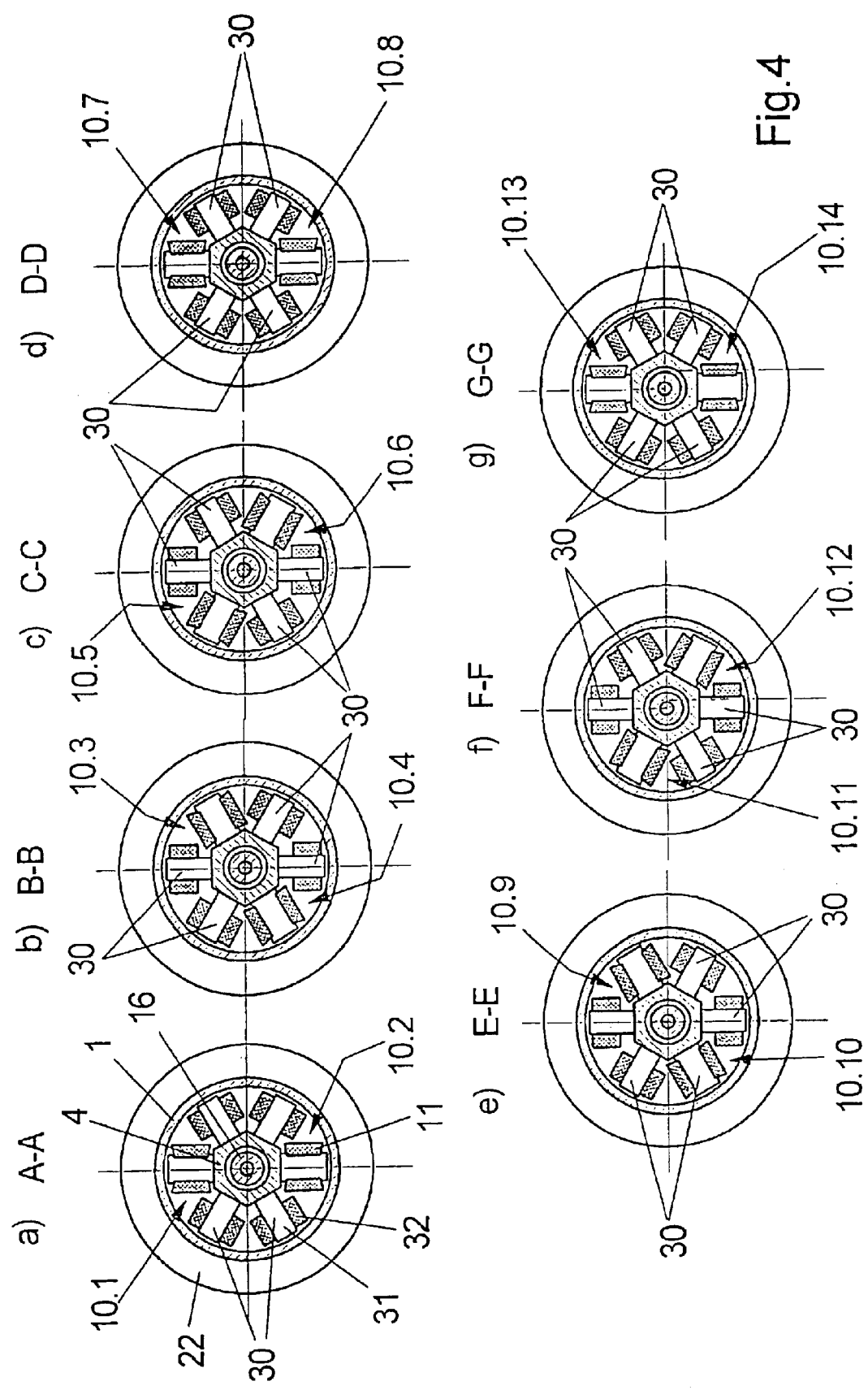

GODET ROLL FOR GUIDING, HEATING AND CONVEYING YARN

CROSS-REFERENCE TO RELATED APPLICATIONS

This application claims the benefit of German patent application 101 04 424.0 filed Feb. 1, 2001, herein incorporated by reference and is a continuation of U.S. patent application Ser. No. 10/061,610, filed Feb. 1, 2002 now U.S. Pat. No. 6,717,309.

FIELD OF THE INVENTION

The present invention relates generally to a godet roll for guiding, heating and conveying yarn. More particularly, the present invention relates to such a godet roll comprising a projecting support, a drivable hollow-cylindrical godet roll casing forming a circumferential yarn guiding surface, at least one radially acting bearing rotatably seating the godet roll casing on the projecting support in at least one bearing plane, the radially acting bearing comprising a plurality of bearing pole windings, and a heating device comprising a plurality of heating pole windings on the support, the bearing pole windings and the heating pole windings being arranged within an annular chamber between the support and the godet roll casing.

BACKGROUND OF THE INVENTION

A godet roll of the above-described type to which the invention relates is disclosed in European Patent Publication EP 0 770 719 B1. This known godet roll heats a rotatably seated godet roll casing, on the circumference of which one or more yarns are guided. The godet roll casing is embodied to be cylindrical and hollow and is seated by means of several magnetic bearings on a projecting support. In addition to the magnetic bearings, a heating device for heating the godet roll casing is arranged in an annular chamber formed between the support and the godet roll casing. Basically, two problems occur with this arrangement, which considerably hamper the function of the godet roll. First, the godet roll casing is only insufficiently heated in the area of the magnetic bearings, such that the yarn or yarns can be guided only in the center area of the godet roll casing in order to receive a thermal treatment of the yarn or yarns.

A further problem is caused by the arrangement of the sensors of the magnetic bearings provided within the annular space for detecting the position of the godet roll casing. With the godet rolls customarily used conventionally, temperatures of approximately 230 degrees Celsius prevail in the interior of the godet roll casing, which directly affect the sensors. Since the magnetic seating requires a very exact determination of the seating of the godet roll casing, and therefore requires very sensitive sensors which, however, can hardly tolerate these high temperatures, a dependable detection of the seating of the godet roll casing, and therefore exact seating by means of the magnetic bearings, is not assured.

SUMMARY OF THE INVENTION

It is therefore a basic object of the present invention to provide an improved godet roll of the type described above and, more particularly, to provide a godet roll wherein uniform heating of the godet roll casing is possible without a deleterious effect on the magnetic seating of the godet roll casing. It is a further object of the present invention to enable the detection of the position of the godet roll casing essentially unaffected by the heating device.

In accordance with the present invention, these objects are addressed by providing a godet roll wherein at least one of the heating pole windings is arranged in a bearing plane between the bearing pole windings of the bearing plane and wherein a plurality of sensors are provided outside the annular chamber for determining the position of the godet roll casing and are connected with a control device for controlling the bearing pole windings.

Such a godet roll of the present invention is particularly distinguished in that the bearing areas of the godet roll casing can be directly heated. At least one of the heating pole windings is arranged in one of the bearing planes between the bearing pole windings of the bearing plane for this purpose. A bearing plane is defined as that normal plane of the godet roll in which the bearing pole windings are arranged. Therefore, the godet roll casing is not only radially supported in the bearing plane, but is simultaneously heated by the current generated by the heating pole winding. In such case, the air gap set between the heating pole windings and the godet roll casing is a function of the bearing gap controlled between the bearing pole windings and the godet roll casing. Therefore, the combination of the present invention allows the setting of the smallest air gaps, so that a loss-resistant heating of the godet roll casing is possible. The heating pole windings, as well as the bearing pole windings, can act in the same or in opposite directions. When acting in the same direction, the air gap and the bearing gap are formed between the pole ends and the godet roll casing. When acting in the opposite direction, the air gap is formed between the godet roll casing and the pole ends of the heating windings, and the bearing gap is formed between a hub or shaft and the pole ends of the bearing windings.

A further feature of the present invention is particularly advantageous for obtaining a seating of the godet roll casing which is as rigid and vibration-free as possible, and therefore an air gap between the heating pole windings and the godet roll casing extends uniformly over the entire length of the godet roll casing. According to this feature of the invention, the bearing pole windings of the magnetic bearing are distributed over at least three bearing planes, with at least some of the heating pole windings of the heating device being provided in the bearing planes between the bearing pole windings. A distribution of the bearing pole windings over several bearing planes has the advantage that a flat seating, and therefore a flat support of the godet roll casing, is achieved. Thus, the distribution of the bearing pole windings and the heating pole windings over the support provides for a uniform distribution of the positions at which a force is introduced for the radial seating of the godet roll casing, as well as induced currents for heating the godet roll casing. Thus, the tendency of the godet roll to become deformed at high speeds, for example to bend in case of sympathetic vibrations, is reduced by the flat seating of the godet roll casing.

In accordance with another advantageous development of the invention, the heating pole bearings and/or the bearing pole windings can be distributed over a support at offsets relative to each other from one bearing plane to another bearing plane. In case of such an angular offset arrangement of two pole windings, the angular position of a second pole winding in a second bearing plane is differentiated from a first bearing winding in a first bearing plane. The angular position of a pole winding is the position of the pole winding at the circumference of the support. If a position perpendicularly above the axis of rotation is selected as the reference position, the angular positions perpendicularly below the axis of rotation are 180 degrees spaced therefrom, and those of the lateral position on the level of the axis of rotation are 90 degrees and 270 degrees spaced therefrom.

With an angularly offset arrangement of the bearing pole windings, the directions from which a force is exerted on the godet roll casing vary. This arrangement makes possible a radial seating of the godet roll casing with an arrangement of only one or two bearing pole windings in one bearing plane, so that a relative large installation space for receiving the heating pole windings is available in the bearing plane. In the process, the bearing pole windings of different bearing planes cooperate.

In accordance with another aspect of the present invention, a spirally-shaped arrangement of at least some heating pole windings and/or bearing pole windings from one bearing plane to the next achieves further uniformity in the distribution of the bearing pole windings on the support. In this connection, it is also possible to combine the heating pole windings of one bearing plane in a common heating zone. In such case, the godet roll casing would be divided in the axial direction into a plurality of heating zones, such that each one of the heating zones can be heated by at least one, or several, heating pole windings.

However, it is also possible to arrange the heating pole windings and/or the bearing pole windings overlappingly in the circumferential direction of the support. In this manner, it is possible to achieve a uniform and large energy density, particularly for heating the godet roll casing.

The provision of the godet roll of the present invention with several sensors arranged outside of the annular space for determining the position of the godet roll casing, so that no thermal overload of the sensors can occur, represents a further attainment of the basic object of the invention. The sensors are coupled with a control device which controls the bearing pole windings. In such case, the sensors can be positioned at locations at which the surroundings permit a sensitive position measurement in every operating range. It is presumed that the bearing gap changes occurring between the bearing pole windings and the godet roll casing are propagated to each position connected with the godet roll casing because of the rigidity of the godet roll casing.

According to a particularly preferred further development of the invention, the sensors are arranged in the area of the bearing planes, wherein air gaps are formed between the godet roll casing and the support in the area of the bearing planes outside of the annular gap, with the bearing planes being essentially parallel in respect to a bearing gap formed between the godet roll casing and the pole ends of the bearing pole windings. Here, the sensors for monitoring the air gaps are embodied as distance sensors. This arrangement allows a very sensitive and delicate position determination, which assures the exact control of the magnetic bearings.

In such an embodiment, the air gaps can be formed, on the one hand, on a free end of the support inside the godet roll casing between a hub connected with the godet roll casing or, on the other hand, on the clamped end of the support outside of the godet roll casing between the godet roll casing and a collar connected with the support. In this manner, the position of the godet roll casing can be determined at both ends, so that an alignment by means of the magnetic bearing is assured.

A particularly advantageous further development of the invention provides for a sensor to be assigned to each bearing pole winding, such that the bearing pole windings are each separately controllable by means of the control device. This embodiment is particularly advantageous with an arrangement of individual bearing pole windings in individual bearing planes for the possible arrangement of several heating pole windings in the bearing planes.

However, it is also possible to control the bearing pole windings in pairs by means of the control device. In this case, a pair of bearing pole windings can be arranged in one or in two bearing planes.

In another embodiment, the godet roll casing is seated by means of an additional axial bearing for absorbing the axial forces. The axial bearing is preferably designed as an axially acting magnetic bearing. However, it is also possible to constitute the axial bearing by means of rolling bearings of an axial or radial design.

To assure the emergency running of the godet roll casing, at least one catch bearing is provided, which can be embodied as a contactless radial bearing or a resiliently connected radial bearing.

Exemplary embodiments of the godet roll in accordance with the present invention will be described in greater detail in the following disclosure, with reference to the attached drawings.

BRIEF DESCRIPTION OF THE DRAWINGS

FIGS. 1 and 2 are schematic cross-sectional views of a first exemplary embodiment of a godet roll in accordance with the present invention, and FIGS. 3 and 4 are schematic cross-sectional views of a further exemplary embodiment of a godet roll in accordance with the present invention.

DETAILED DESCRIPTION OF THE PREFERRED EMBODIMENT

Figure 1:
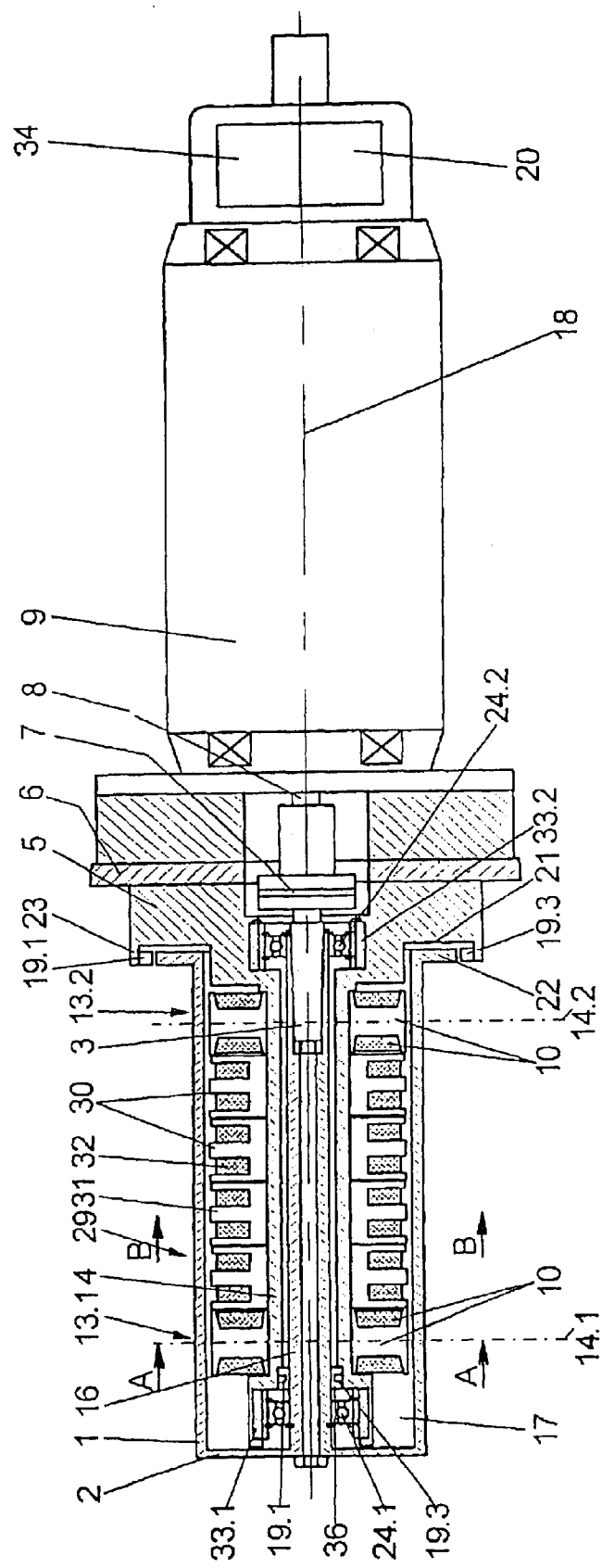

A first exemplary embodiment of the godet roll in accordance with the invention is represented in FIGS. 1 and 2. FIG. 1 shows the elements of the godet roll which are essential for the invention, depicted by means of a cross-section taken parallel to and through the axis of rotation, and FIG. 2 schematically shows cross-sections taken perpendicularly to the axis of rotation, a section through one of the bearing planes A—A being represented in FIG. 2.1, and a section taken along line B—B outside of the bearing planes being represented in FIG. 2.2.

Therefore the following description applies to each of the drawings of FIGS. 1, 2.1 and 2.2, whether or not an explicit reference is made to one of the drawing figures.

The exemplary embodiment of the godet roll in accordance with the invention has a godet roll casing 1, which is fixedly connected via a front wall 2 and a hub 16 with a shaft 3 extending inside the godet roll casing 1 against relative rotation therebetween. The opposite end of the shaft 3 is connected via a coupling 7 to a drive shaft 8 of a motor 9. The motor 9, preferably embodied as an electric motor, is shown in a plan view in FIG. 1.

The godet roll casing 1 is seated on a projecting support 4 by means of two radially acting magnetic bearings 13.1, 13.2, which are arranged inside an annular chamber 17 formed between the godet roll casing 1 and the projecting support 4. The magnetic bearings 13.1, 13.2 are attached at a distance from each other on the support 4, with the magnetic bearing 13.1 being located at a free end of the support 4, and the magnetic bearing 13.2 being located in the area of the fixedly clamped end of the support 4. The support 4 is embodied as a hollow cylinder and extends inside the godet roll casing 1 up to a short distance from the front wall 2. In this embodiment, the support 4 is penetrated by the hub 16 and the shaft 3. On the end opposite the front wall 2, the support 4 is fastened on a frame 6 by means of a collar 5.

The magnetic bearings 13.1, 13.2 each have four bearing pole windings 10.1 to 10.4, which are arranged at relative spacings on the support 4 within respective bearing planes 14.1 and 14.2. Each one of the bearing pole windings 10 is comprised of an exciter winding 11 and a pole element 12. The bearing pole windings 10.1 to 10.4 of each of the magnetic bearings 13.1 and 13.2 are arranged on the support 4 in each respective bearing plane 14.1 and 14.2 at angularly offset spacings from one another. Here, the angular offset is 90 degrees. This arrangement is represented in FIG. 2.1, wherein FIG. 2.1 represents a cross-section through the magnetic bearing 13.1, as well as a cross-section through the magnetic bearing 13.2.

A heating device 29 for heating the godet roll casing 1 is arranged on the circumference of the support 4. For this purpose, the heating device 29 has a plurality of heating pole windings 30, which are arranged next to each other and essentially uniformly distributed in the axial direction of the support 4 as well as in the radial direction of the support 4. Some of the heating pole windings 30 are arranged on the support 4 in the bearing planes 14.1 and 14.2 between the bearing pole windings 10. Each one of the heating pole windings 30 is comprised of a pole element 31 and an exciter winding 32. The exciter windings 32 of the heating pole windings 30 are connected together, or in groups constituting individual heating zones, with a heater control 34. The heater control 34 is located on the power take-off side of the godet roll.

A cross section of one of the bearing planes 14.1 or 14.2 (FIG. 2.1), as well as a cross section through the center area of the godet roll (FIG. 2.2), are represented in FIG. 2. The support 4 is designed as a polygon for receiving the heating pole windings 30 and the bearing pole windings 10. In the illustrated embodiment, a total of eight outer faces is provided on the support 4, to which the pole elements 12 of the bearing pole windings 10 and the pole elements 31 of the heating pole windings 30 are fastened. In this embodiment, as represented in FIG. 2.1, the bearing pole windings 10.1 to 10.4 of the magnetic bearing 13.1 are respectively arranged on four outer faces of the support 4 such that the bearing pole windings 10.1 to 10.4 are respectively offset from one another by 90 degrees. One heating pole winding 30 is located on each of the other outer faces of the support 4 formed between the bearing pole windings 10.1 to 10.4. An air gap 35 is formed between the pole ends of the heating pole windings 30 and the godet roll casing 1. A bearing gap 15 is formed between the pole ends of the bearing pole windings 10 and the godet roll casing 1. The gap widths of the bearing gap 15 and the air gap 35 can be of equal size or embodied to be different.

A cross section outside of the bearing planes 14.1 and 14.2 is represented in FIG. 2.2. Here, the respective pole elements 31 of the heating pole windings 30 are fastened on the eight outer faces of the support 4. Thus, a total of eight heating pole windings 30 are arranged in an angularly offset manner on the support 4, the angular offset in this case being 45 degrees. The air gap 35 is formed between the pole ends of the heating pole windings 30 and the godet roll casing 1.

From the illustration in FIG. 1, it can be seen that the diameter of the collar 5 of the support 4 at its end adjacent the frame 6 is greater than the two matching diameters of the front wall 2 and the godet roll casing 1. The collar 5 of the support 4 has an annular flange 23 extending toward the godet roll casing 1, which covers a shoulder 22 formed on the end of the godet roll casing 1 at a spacing therefrom. Several sensors 19 facing toward the shoulder 22 of the godet roll casing 1 are arranged on the radially inward surface of the flange 23. A total of four sensors 19.1 to 19.4 are provided, with only the sensors 19.1 and 19.3 being visible in FIG. 1, the sensors 19.1 to 19.4 being respectively assigned to the bearing pole windings 10.1 to 10.4 of the magnetic bearing 13.2. The sensors 19.1 to 19.4 serve as distance sensors for detecting the position of the godet roll casing 1 and are connected with a control device 20 via signal lines, not represented in the drawings. The control device 20 is connected via control lines with the exciter windings 11 of the bearing pole windings 10.1 to 10.4 of the magnetic bearing 13.2.

For monitoring the godet roll casing 1, the air gap formed between the sensors 19 and the shoulder 22 is monitored.

A recess 36 is formed on the support 4 at the free end of the support 4 interiorly of the support in the area of the bearing plane 14.1. Several sensors 19.1 to 19.4 are fastened on the support 4 in the notch 36 at angular offsets with respect to each other within a common plane. In this case, the sensors 19.1 to 19.4 are assigned to the bearing pole windings 10.1 to 10.4. Hereagain, the sensors 19.1 to 19.4 are coupled via signal lines with the control device 20. The exciter windings 11 of the bearing pole windings 10 of the magnetic bearing 13.1 are controlled via the control device 20. To detect the position of the godet roll casing 1, an air gap formed between the sensors 19 and the hub 16 is monitored.

In order to absorb axial forces of the godet roll casing 1, as well as for the start-up and emergency seating, two radial bearings 24.1 and 24.2 are provided. In this case, the ends of the support 4 have annular depressions facing toward the hub 16 of the godet roll casing 1, each of which receives one of the radial bearings 24.1 and 24.2 arranged on the support 4. Here, the radial bearings 24.1 and 24.2 are respectively arranged via a sleeve 33 between the support 4 and the hub 16. For this purpose, the sleeve 33, for example, could be equipped with a metal ring at the radially inward side of the sleeve for receiving the radial bearing 24, and an elastomer ring at the radially outward side for engaging the support 4. With this arrangement, a dependable start-up, or emergency running of the godet roll casing independently of the magnetic bearing, is assured. The radial bearings 24.1 and 24.2 are braced against each other for absorbing the radial force, shown by way of example by means of several locking rings.

During operation, the actual position of the godet roll casing is measured by the sensors 19 in the area of the bearing planes 14.1 and 14.2, and the measured values are forwarded to the control device 20. The position of the godet roll casing in the bearing planes 14.1 and 14.2 is determined in the control device 20 from the measured values and the individual exciter windings 11 of the bearing pole windings 10 of the magnetic bearings 13.1 and 13.2 are actuated in accordance with the desired correction of the position. In this case, the bearing pole windings of one of the magnetic bearings 13.1 or 13.2 are actuated either individually or in pairs, so that the position of the godet roll casing 1 takes up the desired position.

The godet roll casing 1 is simultaneously heated by means of the currents induced in the godet roll casing 1 by the heating pole windings 30. One or several temperature sensors (not represented in the drawings) are provided for regulating the surface temperature of the godet roll casing, which are connected via signal lines with the heater control 34 and therefore make a set point adjustment of the surface temperatures possible. The exciter windings 32 of the heating pole windings 30 are controlled in accordance with the signals by the heater control 34. In an embodiment which establishes several heating zones, one temperature sensor is assigned to each respective heating zone, which makes possible the actuation of the heating pole windings of each respective heating zone via the heater control for reaching a preselected set point temperature. Essentially the entire casing area of the godet roll casing 1 is heated by means of the arrangement of the heating pole windings 30 in accordance with the invention. In this manner, the areas in the bearing planes can also be used for yarn guidance and yarn treatment.

Figure 3:
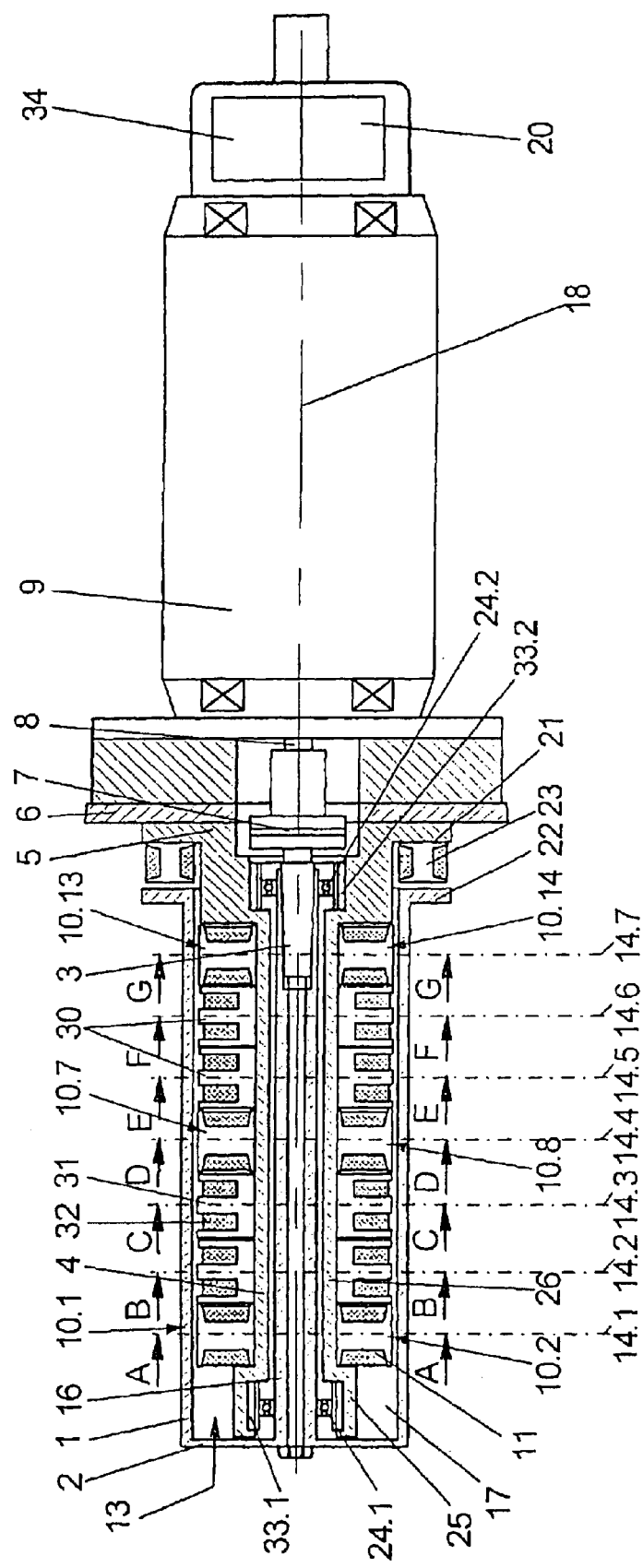

A further exemplary embodiment of the godet roll in accordance with the present invention is represented in FIGS. 3 and 4. Here, FIG. 3 shows a schematic longitudinal section through the elements of the godet roll essential for the invention, and FIGS. 4a) to 4g) each show a cross section through the bearing planes of the godet roll. Components with the same functions are provided with identical reference numerals.

The following description applies to FIGS. 3 and 4, except in cases of explicit references made to one of the drawing figures. This exemplary embodiment essentially corresponds to the exemplary embodiment of the godet roll in accordance with the invention in FIG. 1, so that only the differences will be explained in the following description. In this embodiment, the godet roll casing 1 is seated on the projecting support 4 by means of only one magnetic bearing 13. For this purpose, the magnetic bearing 13 has a total of fourteen bearing pole windings 10.1 to 10.14, which are arranged in pairs opposite each other, each in one bearing plane 14. Thus, the bearing pole windings 10.1 to 10.14 are distributed within a total of seven bearing planes 14.1 to 14.7. The angular positions of the two bearing pole windings 10.1 and 10.2 to 10.12 and 10.14 in the bearing planes 14.1 to 14.7 are 0 degrees and 180 degrees, 60 degrees and 240 degrees, 120 degrees and 30 degrees, 0 degrees and 180 degrees, 60 degrees and 240 degrees, 120 degrees and 300 degrees and 0 degrees and 180 degrees, i.e. the bearing pole windings 10.1 to 10.14 are arranged at angular offsets from bearing plane to bearing plane. The bearing pole windings 10.1 to 10.14 thusly form two spirals around the axis of rotation 18, each with two revolutions of constant rise.

Each of the bearing pole windings 10.1 to 10.14 have cylindrical pole elements 12, around which exciter windings 11 are wound. The pole elements 12 of the bearing pole windings 10.1, 10.2 to 10.13, 10.14 are arranged in pairs in their respective bearing plane 14 on two oppositely located outer faces of the section 26 of the support 4, also embodied in a hexagonal cross-sectional configuration.

Several heating pole windings 30 of a heating device are arranged on the support 4 between the bearing pole windings 10.1 to 10.14, which inductively heat the godet roll casing. For this purpose, the heating pole windings 30 are arranged in each bearing plane on the remaining outer faces of the section 26 of the support 4 which are not occupied by the bearing pole windings. Here, the heating pole windings 30 are comprised of a pole element 31 and an exciter winding 32. The exciter windings 32 are connected via control lines to a heater control 34. The uniform distribution of the bearing pole windings 10.1 to 10.14 on the support 4 also makes possible a uniform distribution of the heating pole windings 30 on the support 4, and thus uniform heating of the godet roll casing 1, besides the flat seating.

The sensors 19 have been omitted from FIGS. 3 and 4 for the sake of clarity.

A magnetic axial bearing 23 is located on the shoulder 22 of the godet roll casing 1. The bearing pole elements with their exciter windings of the axial bearing 23 are arranged on a step 21 of the collar 5 of the support 4 and face in the direction toward the shoulder 22 of the godet roll casing 1.

Moreover, at least one mechanical contactless radial bearing 24 is provided as a catch bearing. In the illustrated embodiments, the ends of the support 4 have annular recesses facing in the direction toward the hub 16 of the godet roll casing 1, each of which recesses receives one of the radial bearings 24 arranged on the support 4.

During operation, the cooperation between the bearing pole windings 10.1 to 10.14 takes place, for example, in case of defined faulty positions of the godet roll casing, by actuating defined bearing pole windings 10.1 to 10.14.

In this case, every one of the bearing pole windings 10.1 to 10.14 acts to attract the godet roll casing 1. For correcting the position of the godet roll casing 1, the force of individual bearing pole windings is increased by increasing the current applied to the corresponding exciter windings 11. The current strength, and therefore the force on the godet roll casing, can remain constant.

It would alternatively be possible to keep the entire current strength for the bearing pole windings 10.1 to 10.14 constant and to only perform a redistribution of the partial current strengths supplied to the individual bearing pole windings 10.1 to 10.14 for correcting the position of the godet roll casing 1.

The exemplary embodiments represented in FIGS. 1 to 4 of a godet roll in accordance with the present invention are shown by way of example as to their construction and their arrangement of the components. The present invention also extends to other exemplary embodiments not represented, wherein at least one heating pole winding is arranged in the bearing planes between the bearing pole windings for heating the bearing area at the godet roll casing. For example, the bearing area could extend between an interior shaft or hub and the bearing pole winding acting toward the interior.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A godet roll for guiding, heating and conveying yarn, the godet roll comprising a projecting support extending in a longitudinal direction, a drivable hollow-cylindrical godet roll casing forming a circumferential yarn guiding surface, at least one radially acting bearing rotatably seating the godet roll casing on the projecting support in at least one radially extending bearing plane, the radially acting bearing comprising a plurality of bearing pole windings in said bearing plane, and a heating device, comprising a plurality of heating pole winding, on the support, the bearing pole windings and the beating pole windings being arranged within an annular chamber between the support and the godet roll casing, whereby at least one of the heating pole windings is arranged in said radially extending bearing plane between at least two bearing pole windings in the same radially extending bearing plane.

2. The godet roll in accordance with claim 1, characterized in that the bearing pole windings of the magnetic bearings are arranged in at least three radially extending bearing planes, and at least some of the heating pole windings are arranged in the bearing planes between the bearing pole windings.

3. The godet roll in accordance with claim 1, characterized in that one or both of the heating pole windings and the bearing pole windings are arranged on the support at angular offsets from bearing plane to bearing plane.

4. The godet roll in accordance with claim 1, characterized in that one or both of the beating pole windings and the bearing pole windings are arranged in overlapping relation in the circumferential direction of the support.

5. The godet roll in accordance with claim 1, characterized in that a plurality of sensors are provided outside the annular chamber for determining the position of the godet roll casing and are connected with a control device for controlling the bearing pole winding.

6. A godet roll in accordance with claim 1 having a plurality of sensors provided outside the annular chamber for determining the position of the godet roll casing, and a control device connected with the sensors for controlling the bearing pole winding.

7. The godet roll in accordance with claim 6, characterized in that the sensors are arranged in the area of the bearing planes, air gaps are formed outside of the annular chamber in the area of the bearing planes between the godet roll casing and the support, the air gaps extending essentially parallel in relation to a bearing gap formed between the godet roll casing and pole ends of the bearing pole windings, and the sensors are designed as distance sensors for monitoring the air gaps.

8. The godet roll in accordance with claim 7, characterized in that one of the air gaps is formed at a free end of the support inside the godet roll casing between a hub connected with the godet roll casing and the support.

9. The godet roll in accordance with claim 7, characterized in that one of the air gaps is formed at a mounted end of the support outside of the godet roll casing between the godet roll casing and a collar connected with the support.

10. The godet roll in accordance with claim 6, characterized in that one of the sensors is assigned to each one of the bearing pole windings, and the bearing pole windings are each individually controllable by means of the control device.

11. The godet roll in accordance with claim 10, characterized in that the bearing pole windings are controllable in pairs by the control device.

12. The godet roll in accordance with claim 1, characterized in that the godet roll casing is seated by means of an additional axial bearing, the axial bearing comprising an axially acting magnetic bearing.

13. The godet roll in accordance with claim 1, characterized in that at least one catch bearing is provided, the catch bearing comprising a contactless radial bearing or as a resiliently clamped radial bearing.

* * * * *